(12) United States Patent
Rice et al.

(10) Patent No.: US 6,813,069 B2
(45) Date of Patent: Nov. 2, 2004

(54) METHOD AND APPARATUS FOR CONTROLLING A FIBER OPTIC PHASED ARRAY UTILIZING FREQUENCY SHIFTING

(75) Inventors: Robert R. Rice, Simi Valley, CA (US);
Neil F. Ruggieri, St. Louis, MO (US);
Richard J. Tansey, Camarillo, CA (US)

(73) Assignee: The Boeing Company, Chicago, IL (US)

( * ) Notice: Subject to any disclaimer, the term of this patent is extended or adjusted under 35 U.S.C. 154(b) by 124 days.

(21) Appl. No.: 10/350,544

(22) Filed: Jan. 24, 2003

(65) Prior Publication Data

US 2004/0145801 A1 Jul. 29, 2004

(51) Int. Cl.[7] .............................. H01S 3/00; H01S 3/13
(52) U.S. Cl. .................................. 359/349; 372/29.011
(58) Field of Search ................................ 359/333, 349; 372/29.011

(56) References Cited

U.S. PATENT DOCUMENTS

| | | | | |
|---|---|---|---|---|
| 4,831,333 A | * | 5/1989 | Welch | ......................... 349/195 |
| 5,412,474 A | * | 5/1995 | Reasenberg et al. | ........ 356/486 |
| 5,694,408 A | | 12/1997 | Bott et al. | |
| 5,832,006 A | | 11/1998 | Rice et al. | |
| 5,847,816 A | | 12/1998 | Zediker et al. | |
| 5,847,817 A | | 12/1998 | Zediker et al. | |
| 5,867,257 A | | 2/1999 | Rice et al. | |
| 6,233,085 B1 | | 5/2001 | Johnson | |
| 6,583,901 B1 | * | 6/2003 | Hung | ........................... 398/79 |
| 6,708,003 B1 | * | 3/2004 | Wickham et al. | ............ 398/102 |

* cited by examiner

Primary Examiner—Mark Hellner
(74) Attorney, Agent, or Firm—Alston & Bird LLP

(57) ABSTRACT

A fiber optic phased array, as well as associated methods and apparatus for controllably adjusting the frequency of the optical signals emitted by a fiber optic phased array, are provided that permit wide band phase control and may be implemented utilizing conventional analog electronics. In this regard, the method and apparatus can independently control the phase of the optical signals propagating through each fiber optic amplifier of the fiber optic phased array, even as large optical phase disturbances occur. As such, the control method and apparatus permit a fiber optic phased array to generate a flat phase front that, in turn, can provide a diffraction limited output laser beam. Alternatively, the control method and apparatus may be designed such that the output signals emitted by an array of fiber optic amplifiers has any other desired phase front, such as to compensate for atmospheric perturbations or the like.

22 Claims, 1 Drawing Sheet

METHOD AND APPARATUS FOR CONTROLLING A FIBER OPTIC PHASED ARRAY UTILIZING FREQUENCY SHIFTING

FIELD OF THE INVENTION

The present invention relates generally to laser systems and more particularly to control systems and methods for controlling the phase of optical signals output by laser systems by utilizing frequency shifting techniques.

BACKGROUND OF THE INVENTION

Lasers are presently employed for a wide variety of applications. For example, lasers are employed to process materials, such as by cutting, welding, heat treating, drilling, trimming and coating materials, stripping paint, removing coatings, cleaning surfaces, and providing laser markings. Lasers are also used in many medical applications for precision surgery. Additionally, lasers are used in military applications, including laser weapon and laser ranging systems. Laser communication systems have also been developed in which laser signals are transmitted in a predetermined format to transmit data.

Along with the ever increasing number of applications in which lasers are used, the demands on the laser systems are also ever increasing. For example, a number of applications, including military, materials processing, medical, and communications applications, demand continuous wave lasers which emit increasingly higher power levels. In addition, a number of applications demand that the laser system produce an output beam which is of high quality, such as by being diffraction limited and/or exhibiting predominantly or entirely fundamental or $TEM_{00}$ mode characteristics. Accordingly, the output beam can be more definitely focused to achieve higher brightness. At the same time, many applications require that the laser system produce an output beam which is adaptable or dynamically controllable.

One example of the need for high power, high quality laser beams is illustrated by the laser devices used to focus on remote targets. In these applications, it is advantageous for the laser beam to achieve a maximum brightness at the location of the target. For example, in military applications, it is advantageous to generate a laser beam that is focused on the remote target with maximum intensity. Similarly, in medical applications, it is essential that the laser beam be focused on the target tissue such that surrounding tissue is not affected.

Several different types of laser devices that generate high power laser beams have been developed by The Boeing Company, assignee of the present application. Examples of these laser device are discussed in detail in U.S. Pat. No. 5,694,408 to Bott et al. and U.S. Pat. No. 5,832,006 to Rice et al., the contents of which are incorporated herein by reference.

The basic approach of these laser devices is to amplify a coherent signal emitted from a master oscillator using a phased array of fiber optic amplifiers. A sample of the output optical signal is extracted for comparison to a reference laser beam that has also typically been output by the master oscillator. The sample of the output optical signal and the reference signal are combined by interference, and the interference signal is sampled by an array of detectors. The difference in phase between the sample of the output optical signal and the reference signal is recorded by the detector, and is used as feedback for altering the phase modulation of the output optical signal via an array of phase modulators that are in optical communication with respective fiber optic amplifiers.

In one example, it may be desired that the plurality of output optical signals be capable of being combined into a diffraction limited signal, thereby requiring that the output optical signals emitted by the fiber optic amplifiers have a constant phase front. Unfortunately, optical path disturbances including those attributable to variations in the optical path length may differently affect the elements of the phased array, thereby requiring independent modulation of the optical signals propagating through the respective fiber optic amplifiers in a manner that is capable of being varied over time as the optical path disturbances vary. These optical path disturbances may be due, for example, to platform shock and vibration, turn-on transients and pumping power fluctuations. Moreover, these optical path disturbances may be many wavelengths and, in some instances, thousands of wavelengths in magnitude and may occur very quickly so that a wide control bandwidth is required.

While a flat phase front is often desirable, some applications will require other types of phase fronts. For example, in one application, a reference beam is initially transmitted to a target of interest. By monitoring the reflection of the beam, atmospheric turbulence in the path of the output laser beam may be detected. To counteract this turbulence, the laser device may desirably alter the phase of the signals emitted by the various fiber optic amplifiers such that the output laser beam has a wavefront that compensates for the atmospheric turbulence.

To provide the desired phase front, the laser devices described by U.S. Pat. Nos. 5,694,408 and 5,832,006 have a feedback loop and an array of phase modulators that control the phase modulation of the output laser beam. Specifically, as discussed, a portion of the output laser beam is combined through interference with a reference signal to determine the phase difference for the signals emitted by each fiber optic amplifier. By use of the feedback signal representative of the phase of the output laser beam and knowledge of the desired wavefront, the output laser beam can be generally controlled via the array of phase modulators to produce the desired wavefront and/or to appropriately steer or tilt the wavefront.

Although these laser systems, for the most part, provide reliable and accurate control of the output laser beam, U.S. Pat. No. 6,233,085 to Bartley C. Johnson, the contents of which are also incorporated by reference herein, describes the feedback loop and the associated array of phase modulators in more detail. In this regard, the control methodology described by U.S. Pat. No. 6,233,085 patent can provide for a wide range of phase modulation by avoiding saturation and uncontrolled modulation changes in the output signal.

Although generally effective, the control methodologies described heretofore in conjunction with fiber optic phased arrays have typically been implemented utilizing digital signal processing techniques. In some applications, such as those applications potentially involving military combat, the reliability of digital signal processing techniques is still questioned. As such, it would be desirable to develop a control system and method for providing wide band phase control for the output optical signals of a fiber optic phased array utilizing conventional analog electronics.

SUMMARY OF THE INVENTION

A fiber optic phased array, as well as associated methods and apparatus for controllably adjusting the frequency of the optical signals emitted by a fiber optic phased array, are provided that permit wide band phase control and may be implemented, if desired, utilizing conventional analog electronics. In this regard, the method and apparatus of the present invention can independently control the phase of the optical signals propagating through each fiber optic amplifier of a fiber optic phased array, even in instances in which optical phase disturbances that are many wavelengths, and perhaps thousands of wavelengths, in magnitude occur, such as due to platform shock and vibration, turn-on transients, pumping power fluctuations and the like. As such, the control method and apparatus of the present invention permit a fiber optic phased array to generate a flat phase front that, in turn, can provide a diffraction limited output laser beam. Alternatively, the control method and apparatus may be designed such that the output signals emitted by an array of fiber optic amplifiers has any other desired phase front, such as to compensate for atmospheric perturbations or the like. Since the control method and apparatus of the present invention are capable of being implemented by conventional analog electronics, the control method and apparatus of the present invention may also be more readily adopted for use in demanding applications, such as combat applications in which the reliability of sophisticated digital electronics may well be questioned.

According to one aspect of the present invention, an apparatus for controllably adjusting the frequency of an optical signal is provided. The apparatus includes a detector assembly for receiving an interference signal generated by optical interference of the optical signal and a first reference signal. The detector assembly then generates a detected output signal having a frequency equal to the difference between the respective frequencies of the optical signal and the first reference signal. In one embodiment, the detector assembly is an optical heterodyne receiver and may include, for example, a photodetector.

The apparatus of this aspect of the present invention also includes a mixer, such as a double balanced mixer, for mixing the detected output signal generated by the detector assembly and a second reference signal. The mixer generates a mixed output signal having a frequency equal to the difference between the respective frequency of the detected output signal and the second reference signal. The apparatus of this aspect of the present invention also includes a voltage-controlled oscillator for generating a feedback signal in response to the mixed output signal. For example, the voltage-controlled oscillator may be a radio frequency (RF) voltage-controlled oscillator having a frequency control port adapted to receive the mixed output signal. The apparatus of this aspect of the present invention further includes a frequency translator for adjusting the frequency of the optical signal in response to the feedback signal. For example, the frequency translator may be an acousto-optic frequency translator for adjusting the frequency of the optical signal in response to the frequency of the feedback signal.

As such, the voltage-controlled oscillator generates the feedback signal to have a frequency that causes the frequency translator to adjust the frequency of the optical signal so as to cause the frequency of the mixed optical signal to be reduced. In one advantageous embodiment, for example, the voltage-controlled oscillator generates the feedback signal to have a frequency that causes the frequency translator to adjust the frequency of the optical signal so as to drive the frequency of the mixed output signal toward zero. By adjusting the frequency of the optical signal in the manner described in accordance with this aspect of the present invention, the phase of the optical signal may be effectively matched with the phase of the first reference signal even as substantial optical path disturbances arise.

Although described in conjunction with an apparatus, a method for controllably adjusting the frequency of an optical signal is also provided in accordance with another aspect of the present invention. In this regard, a detected output signal is generated that has a frequency equal to the difference between respective frequencies of the optical signal and a first reference signal. In one embodiment, for example, the detected output signal is generated based upon an interference signal created by the optical interference of the optical signal and the first reference signal. Thereafter, the detected output signal is mixed with a second reference signal so as to generate a mixed output signal having a frequency equal to the difference between the respective frequencies of the detected output signal and the second reference signal. A feedback signal is then generated in response to the mixed output signal. The frequency of the optical signal is then adjusted in response to the feedback signal. In this regard, the feedback signal may be generated so as to have a frequency that causes the frequency of the optical signal to be adjusted so as to reduce the frequency of the mixed output signal, such as by driving the frequency of the mixed output signal toward zero.

The control method and apparatus of the present invention may be utilized in conjunction with a fiber optic phased array in accordance with another aspect of the present invention. In this regard, the fiber optic phased array includes a plurality of fiber optic amplifiers for individually amplifying respective optical signals. The fiber optic phased array also includes a plurality of frequency translators, such as a plurality of acousto-optic frequency translators, associated with respective fiber optic amplifiers for adjusting the frequency of the respective optical signals. For example, the plurality of frequency translators may adjust the frequency of the optical signals prior to amplification by the respective fiber optic amplifiers.

The fiber optic phased array also includes a detector assembly for receiving a plurality of interference signals associated with respective ones of the fiber optic amplifiers. Each interference signal is generated by optical interference of the optical signal emitted by a respective fiber optic amplifier and a first reference signal. In one embodiment, the detector assembly may include a plurality of optical heterodyne receivers, including a plurality of photodetectors, for receiving respective interference signals. Each optical heterodyne receiver may generate a detected output signal having a frequency equal to the difference between the frequency of the optical signals emitted by the respective fiber optic amplifier and the frequency of the first reference signal.

The fiber optic phased array of this aspect of the present invention also includes a feedback assembly for directing the frequency translators to adjust the frequency of the optical signals propagating through the respective fiber optic amplifiers so as to maintain a predefined frequency relationship with respect to the first reference signal. The feedback assembly may include a plurality of mixers, such as a plurality of double balanced mixers, for mixing the detected output signal generated by respective optical heterodyne receivers and a second reference signal. In this embodiment, the plurality of mixers generate respective mixed output signals having a frequency equal to the difference between the frequency of the respective detected output signal and the second reference signal.

The feedback assembly may also include a plurality of voltage-controlled oscillators for generating feedback signals in response to the respective mixed output signals. The feedback signals direct the respective frequency translators to adjust the frequency of the optical signals propagating through the respective fiber optic amplifiers so as to maintain the predefined frequency relationship with respect to the first reference signal. In one embodiment, for example, the feedback assembly may direct the respective frequency translators to adjust the frequency of the optical signals propagating along the respective fiber optic amplifiers so as to maintain a frequency difference with respect to the first reference signal equal to the frequency of the second reference signal.

The fiber optic phased array may include a variety of other components. For example, the fiber optic phased array may include a beam splitter for splitting the optical signals emitted by the fiber optic amplifiers such that one portion of the optical signals emitted by each fiber optic amplifier is output and another portion of the optical signals emitted by each fiber optic amplifier is directed to the detector assembly. The fiber optic phased array may also include a master oscillator for providing the optical signals to the plurality of fiber optic amplifiers.

By utilizing at least aspects of the control method and apparatus of the present invention, the fiber optic phased array can provide a desired phase front by appropriately frequency shifting the optical signals propagating through the respective fiber optic amplifiers. In this regard, the predefined phase front may be a flat phase front so as to permit a diffraction limited output laser beam. Alternatively, the phase front may have a predefined shape, such as to compensate for atmospheric perturbations or the like. Moreover, the fiber optic phased array, including aspects of the control method and apparatus of the present invention, is capable of providing the desired phase front, even if there are substantial optical path disturbances on the order of many wavelengths, such as thousands of wavelengths, in magnitude. Moreover, the detector and feedback assemblies of the fiber optic phased array of this aspect of the present invention may be implemented utilizing conventional analog electronics and therefore be more readily adopted in at least some applications.

BRIEF DESCRIPTION OF THE DRAWINGS

Figure 1:
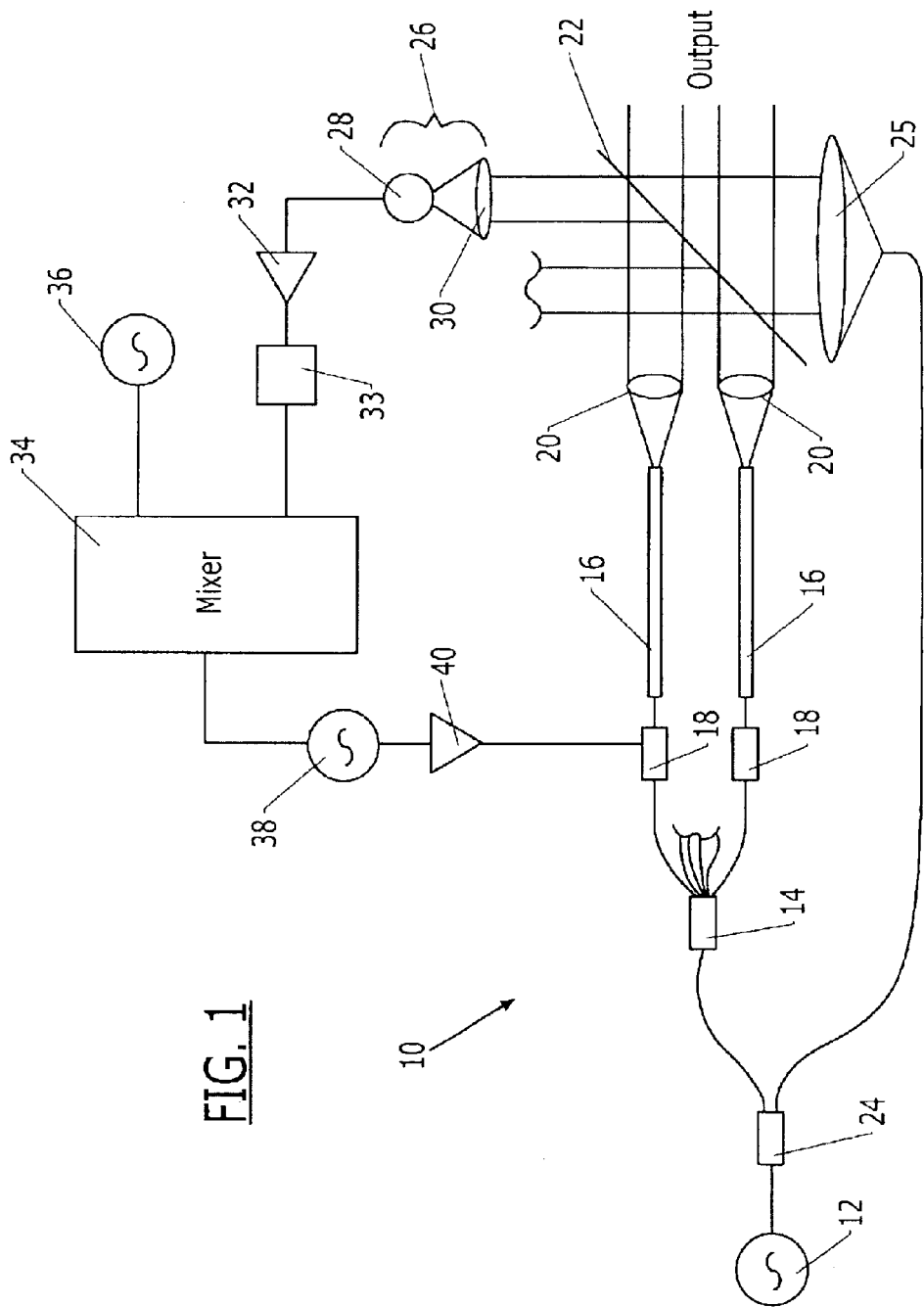

Having thus described the invention in general terms, reference will now be made to the accompanying drawings, which are not necessarily drawn to scale, and wherein:

FIG. 1 is a block diagram of a fiber optic phased array according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, the fiber optic phased array 10 according to one aspect of the present invention is depicted. While the fiber optic phased array of FIG. 1 will be described in more detail hereinafter, the control method and apparatus of other aspects of the present invention may be utilized in conjunction with a wide variety of optical systems in which the phase of the optical signals emitted by the optical system is advantageously controlled, even as the optical system experiences sometimes substantial optical path disturbances on the order of many, or even thousands, of wavelengths in magnitude. In addition, while the control method and apparatus of aspects of the present invention are advantageous in conjunction with the simultaneous control of a plurality of output optical signals so as to obtain a desired phase front, such as a flat phase front with each of the optical signals having the same phase or a phase front having another predefined shape so as to compensate for downstream atmospheric perturbations or the like, the control method and apparatus may, instead, be utilized to control the phase of a single output optical signal, if so desired.

With reference to FIG. 1, a fiber optic phased array 10 is depicted in which an optical signal from a master oscillator 12 is split one or more times and then amplified. The amplified optical signals may then be combined, if desired, to produce an output optical signal having a greater power level than that originally provided by the master oscillator. Although described briefly herein, further details regarding many components of the fiber optic phased array are provided by U.S. Pat. Nos. 5,694,408 and 5,832,006. As shown in FIG. 1, the master oscillator provides an input signal that has a predefined frequency and power level, such as a frequency of 281.95 THz (and a corresponding wavelength of 1.064 microns) and a power level of approximately 20 mW. In addition, since the master oscillator is generally chosen to have a $TEM_{00}$ single frequency, it will also have a predetermined wavelength and linewidth. While the master oscillator may be embodied by various devices, the master oscillator may be a diode pumped fiber laser, a single mode diode laser or diode pumped rods, slabs or mirrors or the like.

The fiber optic phased array 10 may include a beam splitter 14 for splitting the input signal provided by the master oscillator 12 into a plurality of optical signals—two of which are shown completely in FIG. 1 for purposes of clarity. While various types of beam splitters may be utilized, the beam splitter may be a dichroic filter, a partial transmission beam splitter, a fiber optic combiner, an integrated optic combiner or the like. The fiber optic phased array also includes a plurality of fiber optic amplifiers 16 for receiving and amplifying respective ones of the optical signals produced by the beam splitter. In this regard, the fiber optic amplifiers may be optical fibers having a core doped with one or more rare earth elements, such as ytterbium, neodymium, praseodymium, erbium, holmium and thulium. As known to those skilled in the art, a fiber optic amplifier of this type will amplify the optical signal when the fiber optic amplifier is excited by a pump signal. Although not shown, the fiber optic phased array therefore also generally includes one or more pump sources, such as a laser diode, a laser diode array, a fiber optic laser or other suitable pump laser, for exciting the fiber optic amplifiers in order to provide the desired amplification of the optical signals.

As described below, the fiber optic phased array 10 also includes a plurality of frequency translators 18, one of which is associated with each fiber optic amplifier 16 for amplifying the respective optical signals. While various frequency translators may be utilized for controllably altering or shifting the frequency of the optical signals, the frequency translators of one embodiment are in-line acousto-optic frequency translators, such as acousto-optic modulators or Bragg cells, that shift the frequency of the optical signals in a known manner in response to a control signal of a predefined frequency. As shown in FIG. 1, the frequency translators are typically disposed in line with and upstream of the fiber optic amplifiers such that the optical signals are frequency shifted prior to being amplified.

The fiber optic phased array 10 may also include a collimating lens 20 associated with each fiber optic amplifier 16 for collimating the optical signals emitted by the respective fiber optic amplifier prior to being output. Once collimated, the optical signals emitted by the fiber optic amplifiers are output. Although not necessary to the present invention, the collimated optical signals emitted by the fiber optic amplifiers may be recombined, if desired. As a result of the amplification provided by the plurality of the fiber optic amplifiers, the combination of the optical signals will generally have a much greater power level than the input signal originally provided by the master oscillator 12.

In the embodiment described above and illustrated in FIG. 1, the input signal provided by the master oscillator 12 is only split one time, albeit in different ways, in order to provide the optical signals to a single stage of fiber optic amplifiers 16. Alternatively, the optical signals may be split and amplified two or more times if an output laser beam having an even larger power level is desired. As described by the U.S. Pat. No. 5,694,408, for example, the amplified optical signal produced by each fiber optic amplifier of the embodiment depicted in FIG. 1 may each be split and subsequently further amplified by another stage of fiber optic amplifiers prior to being combined to produce a high power output laser beam, if so desired.

In accordance with the present invention, the respective phases of the amplified optical signals emitted by the fiber optic amplifiers 16 are controlled such that the resulting phase front can be controlled to have either a flat phase front in which each amplified optical signal has the same phase or a phase front having another predefined shape or tilt. In order to control the phase of the amplified optical signals, the fiber optic phased array 10 generally includes a beam splitter 22 positioned downstream of the fiber optic amplifiers. While the embodiment of the fiber optic phased array depicted in FIG. 1 includes a single beam splitter, multiple beam splitters could be utilized, including an array of beam splitters with one beam splitter associated with each fiber optic amplifier. Typically, these beam splitters do not evenly split the amplified optical signals. Instead, a majority of the amplified optical signal, such as 90%, 95% or more of the amplified optical signal, is output, while the remainder of the amplified optical signal is redirected so as to be evaluated by the control method and apparatus of other aspects of the present invention. Thus, the beam splitters disposed downstream of the fiber optic amplifiers effectively serve to sample the amplified optical signals for purposes of control and feedback. As before, the beam splitter disposed downstream of the fiber optic amplifier may be embodied in many different manners and may be, for example, a dichroic filter, a partial transmission beam splitter, a fiber optic combiner, an integrated optic combiner or the like.

The respective samples of the amplified optical signals are compared to corresponding reference signal(s). As shown in FIG. 1, the reference signal may be derived from the input signal provided by the master oscillator 12 and, in a typical embodiment, is a sample of the same input signal provided by the master oscillator to the plurality of fiber optic amplifiers 16. As such, the fiber optic phased array 10 may include another beam splitter 24 disposed downstream of the master oscillator and upstream of the fiber optic amplifiers for initially splitting the input signal provided by the master oscillator. This beam splitter again can be embodied in many different manners, including a dichroic filter, a partial transmission beam splitter, a fiber optic combiner, an integrated optic combiner or the like. This beam splitter also does not generally evenly split the input signal provided by the master oscillator. Instead, the beam splitter directs the majority of the input signal, such as 90%, 95% or more of the input signal, to the plurality of fiber optic amplifiers. The remainder of the input signal is redirected by the beam splitter and serves as a first reference signal. As shown in FIG. 1, the first reference signal may be collimated with a collimating lens 25 and compared with respective ones of the amplified optical signals.

While the fiber optic phased array 10 of the embodiment depicted in FIG. 1 utilizes a sample of the input signal provided by the master oscillator as a reference signal, the fiber optic phased array, as well as the control method and apparatus of other aspects of the present invention, may utilize other reference signals, if so desired, without departing from the spirit and scope of the present invention. In addition, while the fiber optic phased array of the embodiment depicted in FIG. 1 utilizes the same reference signal for comparison to the output signal emitted by each fiber optic amplifier, different reference signals could be utilized for comparison to the output signals emitted by different ones of the fiber optic amplifiers. As such, the different reference signals could have different frequencies and/or phases. By comparing and attempting to match the output signals emitted by each fiber optic amplifier to the same reference signal, the fiber optic phased array generates a flat phase front in which each of the output optical signals has the same phase, as described below. By comparing and attempting to match the output signals emitted by the fiber optic amplifiers with different reference signals, however, the fiber optic phased array can generate a phase front having another predetermined shape or tilt may be obtained, if so desired.

According to other aspects of the present invention, the control method and apparatus are provided for analyzing the output signals emitted by each fiber optic amplifier 16. The control apparatus includes a detector assembly 26 for receiving an interference signal generated by the interference of the output signals sampled from the fiber optic amplifiers and the respective first reference signals. In this regard, the optical signals emitted by each fiber optic amplifier are collimated and then brought into interference with a corresponding first reference signal, such as at beam splitter 22 as shown in FIG. 1. The resulting interference signal is captured by the detector assembly.

In a typical embodiment, the detector assembly 26 includes a plurality of optical heterodyne receivers, one of which is adapted to receive the interference signal created by the interference between the output signal sampled from a respective fiber optic amplifier 16 and the corresponding first reference signal. As illustrated in FIG. 1, each optical heterodyne receiver can include a photodetector 28, typically preceded by a focusing lens 30, for detecting the interference signal. The detector assembly is designed to generate a detected output signal having a frequency equal to the difference between the respective frequency of the output signal sampled from each fiber optic amplifier and the corresponding first reference signal. As such, a plurality of detected output signals are produced by the detector assembly, one of which is associated with each output signal. Each output signal generally represents the time-varying fringe pattern of the interference signal at a frequency based upon the frequency difference between the output signal sampled from the respective fiber optic amplifier and the corresponding first reference signal. Additionally, this time-varying fringe pattern has an arbitrary phase that will be controlled according to the control method and apparatus of the present invention.

As described below, the control method and apparatus will controllably alter the optical signals amplified by each fiber optic amplifier 16 such that the detected output signal generated by each optical heterodyne receiver has the same frequency and an identical phase angle or, alternatively, a phase angle bearing a predefined relationship with respect to the phase angles of the other detected output signals. In mathematical terms for a respective optical heterodyne receiver, the reference signal may be designated $E_R \cos(\omega_O t)$ and the output signal sampled from the respective fiber optic amplifier may be represented $E_N \cos(\omega_O t + \omega_N t + \theta_N)$ wherein $\omega_N$ represents the frequency shift and $\theta_N$ represents the phase shift, which may vary over time. As such, the interference signal incident upon the optical heterodyne receiver can be represented as:

$$E_I = E_R \cos(\omega_O t) + E_N \cos(\omega_O t + \omega_N t + \theta_N)$$

The output of the optical heterodyne receiver and, in particular, the photocurrent generated by the optical heterodyne receiver is proportional to the instantaneous optical power of the incident signal which, in turn, is proportional to the square of the electric field of the interference signal. As such, the light intensity of the incident signal may be represented as:

$$I_S = E_R^2 + E_N^2 + 2\sqrt{E_{R_E_N}} \cos(\omega_N t + \theta_N)$$

and the resultant square law detector response will produce a current proportional to the cosine term.

The control apparatus generally includes an amplifier 32 for amplifying the detected output signal generated by a respective optical heterodyne receiver. The control apparatus may also include a bandpass filter 33 downstream of a respective optical heterodyne receiver to remove the DC terms, i.e., $E_r^2$ and $E_n^2$, so that the detected output signals are only proportional to the cosine term. As shown in FIG. 1, the control apparatus further includes a mixer 34 for mixing the detected output signal, following any desired amplification, with a second reference signal. The mixer may be a radio frequency (RF) double balanced mixer, while the second reference signal may be generated by a reference oscillator 36, such as an RF reference oscillator. The reference oscillator provides a second reference signal having a fixed frequency. Although the fixed frequency may be set at various frequencies, the referenced oscillator is typically designed such that the fixed frequency of the second reference signal is generally in the middle of the frequency response band of the in-line frequency translator 18 to ensure reliable operation. In one embodiment, for example, the reference oscillator produces a second reference signal having a frequency of about 40 MHz.

The mixer 34 generates a mixed output signal having a frequency, that is, a beat frequency, equal to the difference in the respective frequencies of the detected output signal and the second reference signal. As such, the control apparatus generates the plurality of mixed output signals, one of which is associated with the output signal sampled from each fiber optic amplifier. At least initially, each mixed output signal typically consists of a DC signal with AC components associated therewith. As a result of the operation of control method and apparatus of the present invention, however, the DC components of each mixed output signal are eliminated.

Stated another way, the second reference signal generated by the reference oscillator 36 generally has a frequency of $\omega_{IF}$. By operation of the control method and apparatus of the present invention, the argument of cosine function in the foregoing equation is driven to equal the frequency of the second reference signal, that is, $\omega_{IF}$. In other words, the control method and apparatus of the present invention function to drive the behavior of the fiber optic phased array 10 such that the following relationship is met:

$$\omega_{IF} t = \omega_N t + \theta_N.$$

The control apparatus of this aspect of the present invention also includes a voltage-controlled oscillator 38 for generating a feedback signal in response to the mixed output signal. In one advantageous embodiment, the voltage-controlled oscillator is an RF voltage-controlled oscillator having a frequency control port that receives the mixed output signal and is designed to operate over a frequency range well above and below the frequency of the reference oscillator 36 and, in particular, the frequency of the second reference signal generated by the reference oscillator. For each fiber optic amplifier 16, the respective voltage-controlled oscillator generates the feedback signal to have an instantaneous frequency that, when applied to the optical signals via the in-line frequency translator 18, maintains frequency and phase lock between the output signals emitted by the respective fiber optic amplifier 16 and the first reference signal with an offset equal to the frequency of the second reference signal generated by the reference oscillator. In other words, the frequency of the feedback signal generated by the voltage-controlled oscillator is driven such that:

$$\frac{d}{dt}\theta_N = \omega_{IF} - \omega_N.$$

The feedback signal generated by the voltage-controlled oscillator 38 is applied to the respective inline frequency translator 18. As shown in FIG. 1, the control apparatus can also include another amplifier 40 disposed between the voltage-controlled oscillator and the inline frequency translator in order to appropriately amplify the feedback signal, if desired. As will be recognized by those skilled in the art, the frequency translator then adjusts the frequency of the optical signal in response to the feedback signal and, in particular, in response to the frequency of the feedback signal. Thus, the feedback signal generated by the voltage-controlled oscillator causes the inline frequency translator to increase or decrease the frequency of the respective optical signal so as to reduce the frequency of the mixed output signal. In general, the feedback signal generated by the voltage-controlled oscillator causes the inline frequency translator to increase or decrease the frequency of the respective optical signal so as to drive the frequency of the mixed output signal toward zero. As such, the frequency of the optical signals will be controllably adjusted in response to optical path disturbances such that a predefined phase relationship is maintained between the output signal and the first reference signal and such that the output signal and the first reference signal are offset in frequency by the frequency of the second reference signal generated by the reference oscillator 36.

The control method and apparatus of this aspect of the present invention are extremely robust and are capable of very quickly accommodating large optical path disturbances, such as those that are many wavelengths or hundreds of wavelengths in magnitude, since, among other reasons, the frequency of the voltage-controlled oscillator 38 may be slewed by large amounts in short time intervals. Typically, the magnitude and rate of the optical path disturbances that may be accommodated and tracked out by the control method and apparatus of this aspect of the present invention depend upon the frequency offset and the fractional bandwidth of the control loop. For example, a reference oscillator 36 that has a center frequency of 40 MHz with a 25% controlled loop bandwidth of +/−10 MHz would accommodate optical path disturbances having an absolute magnitude of thousands of wavelengths.

In embodiments in which the plurality of output signals sampled from the plurality of fiber optic amplifiers 16 are all compared to the same first reference signals, such as the same first reference signal sampled from the input signal provided by the master oscillator 12, the fiber optic phased array 10 will be driven by the control apparatus and method to have a flat phase front, i.e., the output signals emitted by each fiber optic amplifier will controlled so as to have the same phase. Thus, the plurality of output signals may be advantageously focused to produce a diffraction limited single lobe. Alternatively, the fiber optic phased array may be designed to generate phase fronts having other predefined shapes or tilts by providing first reference signals having the desired phase relationships. By matching the phase of the output signals sampled from the respective fiber optic amplifiers with corresponding first reference signals, the resulting phase front will have the predefined shape even as the system is subjected to optical path disturbances. As such, the predefined shape may be designed to accommodate for atmospheric perturbations or the like by appropriately controlling the phase relationship between the first reference signals.

For purposes of clarity, FIG. 1 depicts the control apparatus, i.e., feedback loop, for a single element of the fiber optic phased array 10. However, those skilled in the art will appreciate that the fiber optic phased array includes a control apparatus of the type depicted in FIG. 1 and described above for each element of the fiber optic phased array. Thus, the control apparatus generally includes a plurality of independent feedback loops that control the output of respective fiber optic amplifiers 16. Although not necessary for the practice of the present invention, some of the feedback loops may utilize or share one or more common components, such as the reference oscillator 36, if desired. Moreover, since the control method and apparatus of the present invention are capable of being implemented by conventional analog electronics, the control method and apparatus of the present invention may also be more readily adopted for use in demanding applications, such as combat applications in which the reliability of sophisticated digital electronics may well be questioned.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for controllably adjusting frequency of an optical signal, the apparatus comprising:
   a detector assembly for receiving an interference signal generated by optical interference of the optical signal and a first reference signal and for generating a detected output signal having a frequency equal to the difference between respective frequencies of the optical signal and the first reference signal;
   a mixer for mixing the detected output signal generated by said detector assembly and a second reference signal and for generating a mixed output signal having a frequency equal to the difference between respective frequencies of the detected output signal and the second reference signal;
   a voltage-controlled oscillator for generating a feedback signal in response to the mixed output signal; and
   a frequency translator for adjusting the frequency of the optical signal in response to the feedback signal,
   wherein said voltage-controlled oscillator generates the feedback signal to have a frequency that causes said frequency translator to adjust the frequency of the optical signal so as to reduce the frequency of the mixed output signal.

2. An apparatus according to claim 1 wherein said voltage-controlled oscillator generates the feedback signal to have a frequency that causes said frequency translator to adjust the frequency of the optical signal so as to drive the frequency of the mixed output signal toward zero.

3. An apparatus according to claim 1 wherein said frequency translator comprises an acousto-optic frequency translator for adjusting the frequency of the optical signal in response to the frequency of the feedback signal.

4. An apparatus according to claim 1 wherein said detector assembly comprises an optical heterodyne receiver.

5. An apparatus according to claim 4 wherein said optical heterodyne receiver comprises a photodetector.

6. An apparatus according to claim 1 wherein said mixer comprises a double balanced mixer.

7. An apparatus according to claim 1 wherein said voltage-controlled oscillator comprises a radio frequency (RF) voltage-controlled oscillator having a frequency control port adapted to receive the mixed output signal.

8. A fiber optic phased array comprising:
   a plurality of fiber optic amplifiers for individually amplifying respective optical signals;
   a plurality of frequency translators associated with respective fiber optic amplifiers for adjusting the frequency of the optical signals propagating therealong;
   a detector assembly for receiving a plurality, of interference signals associated with respective ones of said fiber optic amplifiers with each interference signal generated by optical interference of the optical signal emitted by respective fiber optic amplifier and a first reference signal; and
   a feedback assembly for directing said frequency translators to adjust the frequency of the optical signals propagating along the respective fiber o tic amplifiers to maintain a predetermined frequency relationship with respect to the first reference signal.

9. A fiber optic phased array according to claim 8 wherein said plurality of frequency translators adjust the frequency of the optical signals prior to amplification by the respective fiber optic amplifiers.

10. A fiber optic phased array according to claim 8 wherein said plurality of frequency translators comprise a plurality of acousto-optic frequency translators for adjusting the frequency of the optical signals in response to direction by said feedback assembly.

11. A fiber optic phased array according to claim 8 wherein said detector assembly comprises a plurality of optical heterodyne receivers for receiving respective interference signals, each optical heterodyne receiver also generating a detected output signal having a frequency equal to the difference between the frequency of the optical signal emitted by the respective fiber optic amplifier and the frequency of the first reference signal.

12. A fiber optic phased array according to claim 11 wherein said plurality of optical heterodyne receivers comprises a plurality of photodetectors.

13. A fiber optic phased array according to claim 11 wherein said feedback assembly comprises a plurality of mixers for mixing the detected output signal generated by respective optical heterodyne receivers and a second reference signal and for generating respective mixed output signals having a frequency equal to the difference between the frequency of the respective detected output signal and the second reference signal.

14. A fiber optic phased array according to claim 13 wherein said plurality of mixers comprises a plurality of double balanced mixers.

15. A fiber optic phased array according to claim 13 wherein said feedback assembly further comprises a plurality of voltage-controlled oscillators, responsive to respective mixers, for generating feedback signals in response to the respective mixed output signals, wherein the feedback signals direct said respective frequency translators to adjust the frequency of the optical signals propagating along the respective fiber optic amplifiers to maintain the predefined frequency relationship with respect to the first reference signal.

16. A fiber optic phased array according to claim 13 wherein said feedback assembly directs said respective frequency translators to adjust the frequency of the optical signals propagating along the respective fiber optic amplifiers to maintain a frequency difference with respect to the first reference signal equal to the frequency of the second reference signal.

17. A fiber optic phased array according to claim 8 further comprising a beam splitter for splitting the optical signals emitted by said plurality of fiber optic amplifiers such that one portion of the optical signals emitted by each fiber optic amplifier is output and another portion of the optical signals emitted by each fiber optic amplifier is directed to said detector assembly.

18. A fiber optic phased array according to claim 8 further comprising a master oscillator for providing the optical signals to said plurality of fiber optic amplifiers.

19. A method for controllably adjusting frequency of an optical signal, the method comprising:

generating a detected output signal having a frequency equal to the difference between respective frequencies of the optical signal and a first reference signal;

mixing the detected output signal and a second reference signal so as to generate a mixed output signal having a frequency equal to the difference between respective frequencies of the detected output signal and the second reference signal;

generating a feedback signal in response to the mixed output signal; and adjusting the frequency of the optical signal in response to the feedback signal, wherein generating the feedback signal comprises generating the feedback signal to have a frequency that causes the frequency of the optical signal to be adjusted so as to reduce the frequency of the mixed output signal.

20. A method according to claim 19 wherein generating the feedback signal further comprises generating the feedback signal to have a frequency that causes the frequency of the optical signal to be adjusted so as to drive the frequency of the mixed output signal toward zero.

21. A method according to claim 19 further comprising creating an interference signal based upon optical interference of the optical signal and the first reference signal, prior to generating the detected output signal based thereupon.

22. A method according to claim 19 further comprising splitting the optical signal such that one portion of the optical signal is output and another portion of the optical signal is utilized to generate the detected output signal.

* * * * *